United States Patent [19]
Honig et al.

[11] 3,983,741
[45] Oct. 5, 1976

[54] METHOD AND APPARATUS FOR LOCATING DEFECTIVE FUEL RODS IN A REACTOR FUEL ASSEMBLY

[75] Inventors: Harry Honig, Lynchburg, Va.; Alfred Jester, Speyer, Germany

[73] Assignee: The Babcock & Wilcox Company, New York, N.Y.

[22] Filed: May 6, 1975

[21] Appl. No.: 575,111

[30] Foreign Application Priority Data
May 20, 1974 Germany............................ 2424431

[52] U.S. Cl. ...................... 73/15 FD; 176/19 LD
[51] Int. Cl.² ......................................... G01N 25/72
[58] Field of Search ...................... 73/15 R, 15 FD; 176/19 LD

[56] References Cited
UNITED STATES PATENTS 3,240,673  3/1966  Stubbs et al. ....................... 176/19
3,566,669  3/1971  Lawrence et al. ..................... 73/15

Primary Examiner—Herbert Goldstein
Attorney, Agent, or Firm—J. M. Maguire; J. P. Sinnott

[57] ABSTRACT

A typical embodiment of the invention permits defective fuel rods to be identified with the fuel rods arrayed in a fuel element. A bell jacket is placed over the submerged plenum ends of the fuel rods in the fuel element and gas pressure is admitted to the jacket interior to expel water from the enclosed volume and expose the plenum ends of the fuel rods to the gas stream. The cooling effect of the flowing gas on steam rising within the interior of a defective fuel rod causes the steam to condense within the plenum and increase the temperature of the exposed end of the defective rod relative to the ends of the sound rods. An infra red or other suitable temperature detector identifies the higher temperature end of the defective rod for individual removal from the fuel element and replacement, as appropriate.

4 Claims, 4 Drawing Figures

METHOD AND APPARATUS FOR LOCATING DEFECTIVE FUEL RODS IN A REACTOR FUEL ASSEMBLY

BACKGROUND OF THE INVENTION

1. Field of the Invention

The invention pertains to a method and an apparatus for locating defective fuel rods in water cooled nuclear reactors without removal of the fuel rods from the fuel assembly, whereby the fuel assembly standing in an inspection container is covered by a bell jacket (enclosure) and stored in a water pool.

2. Description of the Prior Art

The core of a light water reactor consists of about 40 to 50 thousands of fuel rods, which usually are mechanically joined together in groups of about 200 pieces into, so called, "fuel assemblies." A fuel assembly consists of two end fittings, of control rod guide tubes, of spacer grids and of the fuel rods. The fuel rods consist of Zircaloy -4 cladding tubes, which contain nuclear fuel in oxide form and are closed at both ends with end cups.

During operation, local leaks can sometimes occur in a fuel rod which permits escape of gaseous fission products into the cooling medium and increases its radioactivity. A certain amount of radioactivity in the coolant system can be tolerated. However, it is desirable to keep the radiation level around the reactor system as low as possible.

Because of the above reason the fuel assemblies are subjected to a so-called "seeping test" during each refueling. For this test the fuel assembly is transported under water into the fuel storage pool. The fuel rods and the water are heating up due to the decay heat. If a fuel assembly contains defective rods, the radioactive fission products escape into the water due to the heating. Through sampling of the water and measuring the radioactivity, it is possible to determine whether a fuel assembly contains defective fuel rods. This method is an integral method, which means, that it determines only whether a fuel assembly contains defective fuel rod(s); but it does not provide an answer about the location. Thus, to restore the fuel assembly to its operational readiness it is necessary to locate the defective fuel rods, to pull them out, and to insert into the empty spots new fuel rods, or dummy rods. With the presently known method of locating the defective rods(s), it is necessary to pull all the fuel rods partially or fully and to examine each of them with eddy current or ultrasonic testing, in order to locate the damaged spot(s). The good fuel rods are inserted again into the fuel assembly and the defective ones are replaced by new fuel rods.

This method is very costly and requires a lot of time. It is also the disadvantage that the fuel rods must be pulled out fully or partially. During the pulling and the reinsertion of the fuel rods, the spacer grids leave scratches or grooves on the outer surface of the cladding tube, which can become a starting point for future fuel rod defects.

The object of this invention is to determine the defective fuel rod within the fuel assembly without the necessity of removing any of the fuel rods from the fuel assembly or moving them within the fuel assembly.

SUMMARY OF THE INVENTION

This objective is solved through placing in vertical position the fuel assembly in an inspection container, removing the upper end fitting, lowering the bell jacket over the fuel assembly, pressing out the water from the bell jacket with compressed gas and holding the water level at an elevation N, warming the water in the inspection container to about 100°C, allowing to cool the rod ends protruding above the water level N by the gas flow, while the steam collected at the top of the defective rod ends condenses and elevates their temperature above the temperature of the undamaged rods, and detecting the higher temperature rod ends with a measuring instrument.

Also, according to this invention, it is advantageous to heat up the water in the inspection container with decay heat.

The fuel rods release more or less intense $\gamma$-radiation which could interfere with temperature measurement when performed e.g. by infra-red detectors. According to the invention this can be avoided by deflecting the infra-red rays with mirrors away from the direction of the $\gamma$-rays. The bell jacket required to cover the inspection container is shaped to accommodate the desired deflection of the infra-red rays.

The level N in the inspection container should not sink below the upper edge of the fuel pellets column since the cladding tube in the region of the pellets above the water level will not be water cooled and could experience undesirably high temperatures. According to the invention this can be avoided by always keeping the level N higher than the upper edge of the fuel pellets column.

The method according to the invention has the advantage of a considerable time saving on the detection of defective fuel rods. Since the undamaged fuel rods do not have to be moved from their supports, the danger of injuring the cladding surface of the rods is avoided. This matter represents a considerable improvement over the known methods, because an injury to the rod surface, as already mentioned, may be the cause of further defects. The invention is further explained by the following drawings:

DETAILED DESCRIPTION OF THE PREFERRED EMBODIMENTS

Figure 1:
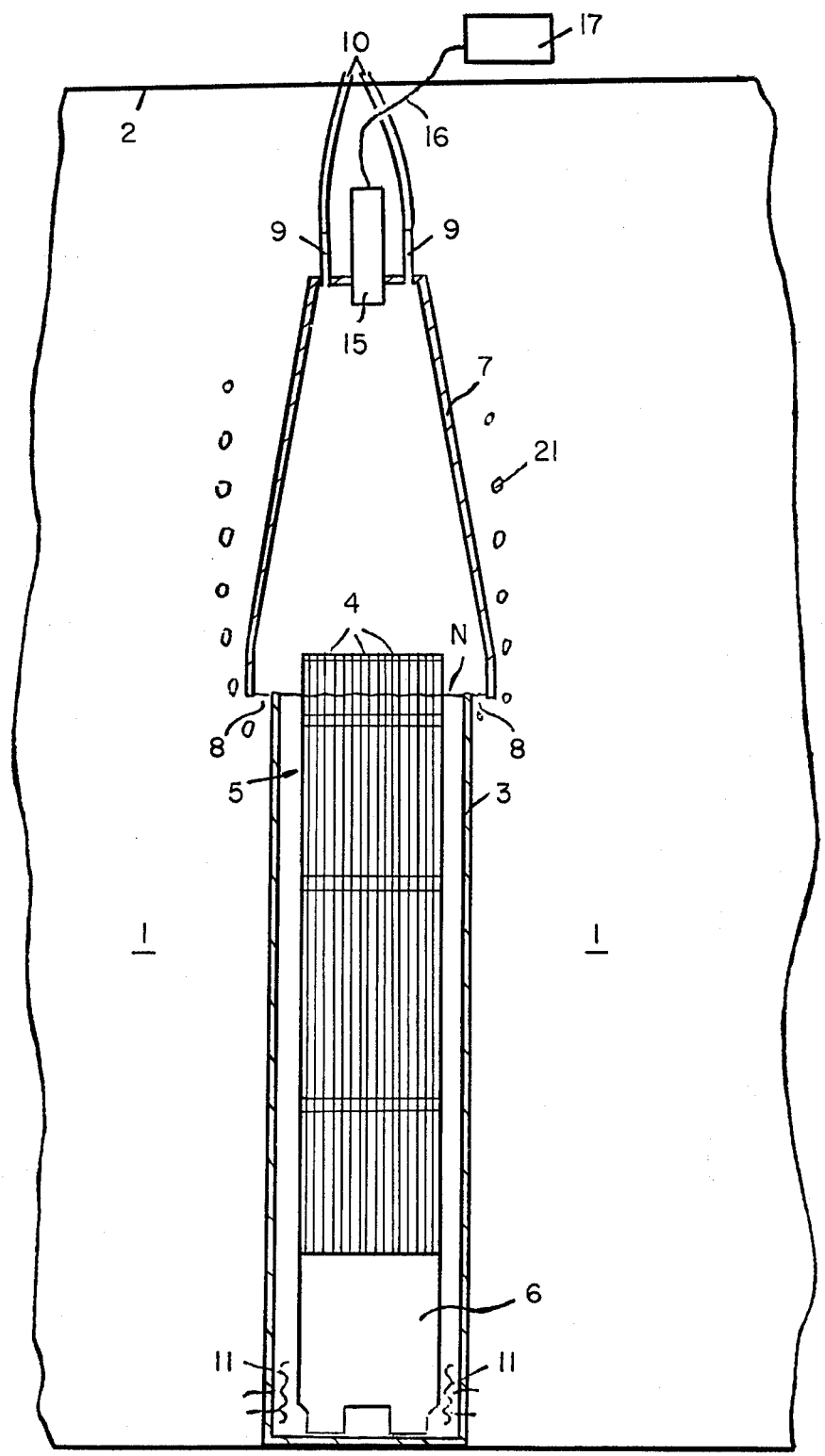
FIG. 1 shows a schematic representation of the inventive method.

FIG. 1 shows a part of the fuel storage pool 1, which is filled with water to the level 2. An inspection container 3, which is open at the top, is stored in the pool. The fuel assembly 5, which is to be inspected for damaged fuel rods 4, is placed vertically in the container 3, with the lower end-fitting 6 on, but the upper end-fitting removed. The bell jacket 7 is lowered by a crane (not shown) over the inspection container 3 so far, that an annulus 8 is formed, that permits expulsion of the water from the bell jacket using compressed gas. Several nozzles 9 are located on the periphery of the bell jacket. These are connected to hoses 10 supplying gas to the bell jacket 7 from a source (not shown).

The pressurized gas presses out the water contained in the bell jacket to a level N and holds this level, while gas bubbles 21 escape through the annulus 8 upwards.

The water filling the inspection container 3 is heated by the residual decay heat and is kept at about 100°C by a heating or cooling device 11.

Figure 2:
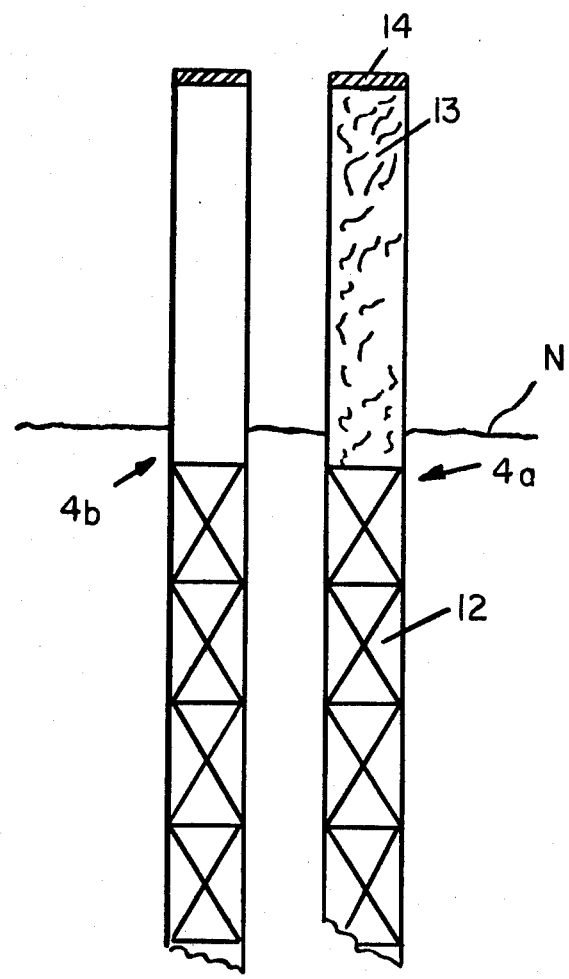
FIG. 2 shows details of a defective and an undamaged fuel rod.

FIG. 2 shows a defective fuel rod 4a and an undamaged fuel rod 4b. It can be seen that in the defective fuel rod the seeping water evaporates to steam. The fuel pellets 12 form a fuel-pellet-column which is held in fixed position shown in FIG. 2 by spacer-grids, not shown.

The water level N should not be kept below the top of the pellet column.

The steam 13 accumulating at the top of the rod condenses on the walls through the cooling effect of the gas flow and delivers the evaporation heat also to the top closure 14 of the defective rod. The scanning instrument 15, which is attached gas-tight to the top of the bell jacket 7, and which preferably operates on the principle of infra-red waves, transmits the temperature values of the top closure of the fuel rods to a monitor 17 via the cable 16.

This way, the location of the defective rods can be ascertained and these can be replaced by undamaged ones.

Figure 3:
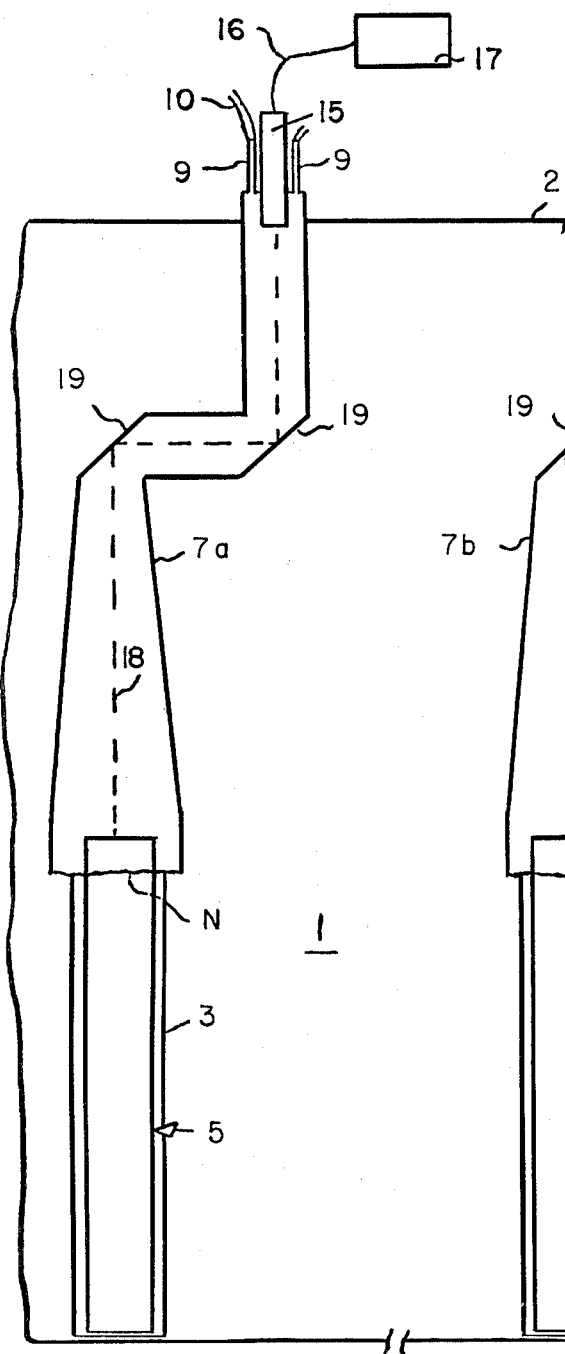
FIGS. 3 and 4 show a special arrangement of the bell jacket.
Figure 4:
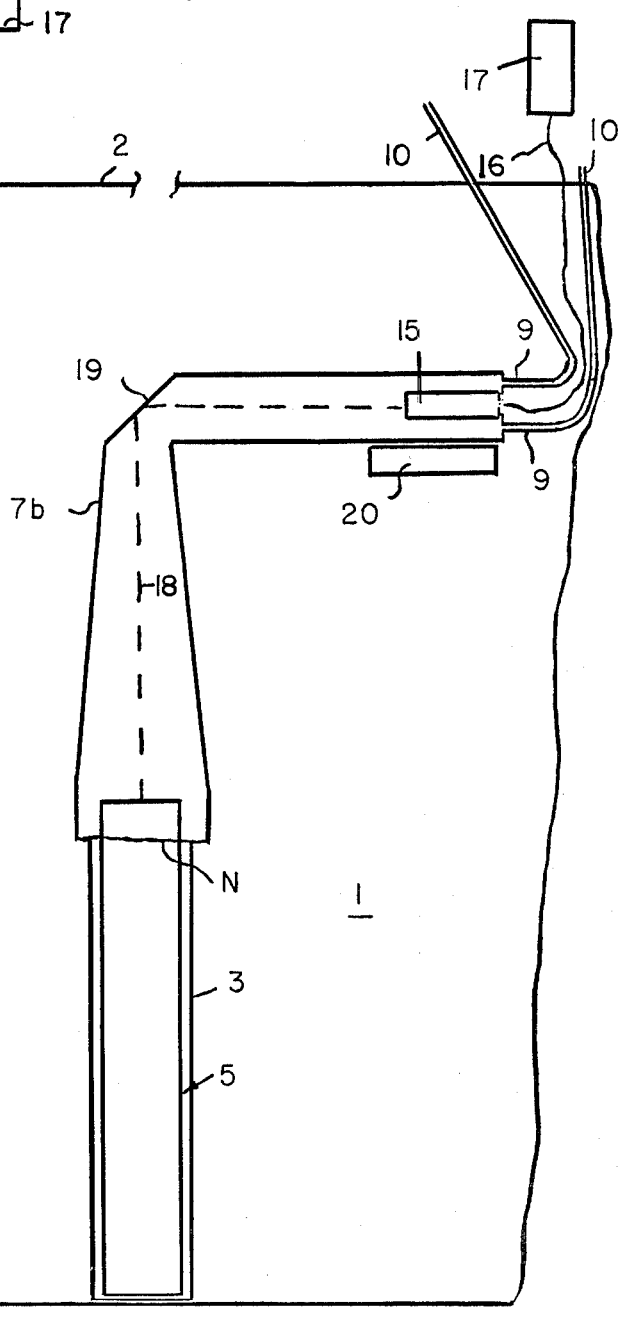

On FIG. 3 and FIG. 4 are shown examples of special constructions of the bell jacket 7a and 7b. In these bell jackets the water level is held at N by the use of a gas flow through the hoses 10 and nozzles 9. In order to avoid a distortion of the temperature measurements with the infra-red rays 18, the rays are deflected with the help of mirrors in specially shaped bell jackets 7a or 7b away from the γ-radiation of fission product contained in the pool 1. The temperature measuring instruments 15, located under the water level, can be protected against γ-radiation by radiation shields 20.

The embodiments of the invention in which an exclusive property or privilege is claimed are defined as follows:

1. Apparatus for locating defective fuel rods in a fuel element for use in a water-cooled nuclear reactor comprising an inspection container for partially enclosing the fuel element, said inspection container having a length that is shorter than the length of the fuel element to enable an end of the fuel element to protrude therefrom, an inverted hollow bell jacket adapted to enclose the protruding fuel element end and at least a portion of said inspection container, gas inlet means in said bell jacket for selectively establishing gas pressure within said bell jar, and temperature measuring means within said bell jacket for registering the temperatures of the fuel rods in the protruding length of the fuel element.

2. Apparatus according to claim 1 further comprising mirror means within said bell jacket for establishing infra-red communication between the fuel rods and said temperature measuring means.

3. Apparatus according to claim 1 further comprising a radiation shield associated with said bell jacket for protecting said temperature measuring means from radiation.

4. A method for identifying defective fuel rods without removing the fuel rods from the fuel element and in which the individual fuel rods each contain a stack of nuclear fuel pellets that is shorter than the lengths of the respective rods in order to establish a plenum at one end of each of the rods, comprising the steps of immersing the fuel element in water at least to a depth that is equal to the length of the fuel pellet stack in order to expose at least a portion of each of the fuel rod plenums and to immerse the portions of the fuel rods that contain the fuel pellet stacks, cooling said exposed portions of the fuel rods and registering the temperatures of said exposed fuel rod portions.

* * * * *